US008162751B2

(12) United States Patent
Kopera et al.

(10) Patent No.: US 8,162,751 B2
(45) Date of Patent: Apr. 24, 2012

(54) GAMING MACHINE WITH COLOR CHANGING CABINET

(75) Inventors: Thomas M. Kopera, Villa Park, IL (US); Walter E. Smolucha, Melrose Park, IL (US)

(73) Assignee: WMS Gaming Inc., Waukegan, IL (US)

( * ) Notice: Subject to any disclaimer, the term of this patent is extended or adjusted under 35 U.S.C. 154(b) by 505 days.

(21) Appl. No.: 12/439,138

(22) PCT Filed: Feb. 28, 2007

(86) PCT No.: PCT/US2007/005215

§ 371 (c)(1), (2), (4) Date: Feb. 26, 2009

(87) PCT Pub. No.: WO2008/030271

PCT Pub. Date: Mar. 13, 2008

(65) Prior Publication Data

US 2010/0004059 A1 Jan. 7, 2010

Related U.S. Application Data

(60) Provisional application No. 60/842,064, filed on Sep. 1, 2006.

(51) Int. Cl.
*A63F 13/00* (2006.01)

(52) U.S. Cl. .......................................................... 463/30

(58) Field of Classification Search .................... 463/30, 463/46

See application file for complete search history.

(56) References Cited

U.S. PATENT DOCUMENTS

| | | | | |
|---|---|---|---|---|
| 2002/0101197 | A1* | 8/2002 | Lys et al. | 315/291 |
| 2004/0106450 | A1 | 6/2004 | Seelig et al. | 463/30 |
| 2004/0166932 | A1* | 8/2004 | Lam et al. | 463/30 |
| 2004/0266524 | A1 | 12/2004 | Williams et al. | 463/30 |
| 2006/0094511 | A1* | 5/2006 | Roireau | 463/46 |
| 2009/0045554 | A1* | 2/2009 | Myers | 264/549 |

OTHER PUBLICATIONS

International Search Report—PCT/US2007/005215 dated Jun. 13, 2008 (2 pages).
International Written Opinion—PCT/US2007/005215 dated Jun. 13, 2008 (5 pages).

* cited by examiner

*Primary Examiner* — Thomas L Dickey
(74) *Attorney, Agent, or Firm* — Nixon Peabody LLP

(57) ABSTRACT

A gaming machine for conducting a wagering game comprises a gaming machine cabinet having one or more colorable or color-changeable exterior sections. The color-changeable exterior sections comprise a translucent material that glows or shines when light is diffused through the material. Sections that are color-changeable include those sections that are visually dominant or affect the overall appearance of the gaming machine. A multi-color lighting assembly having one or more multi-color light sources is present. The multi-color lighting assembly may be operated to direct light having a predetermined color or sequence of colors. The light causes the color-changeable exterior sections to project the predetermined color or sequence of colors, thereby changing the overall appearance of the gaming machine. The predetermined color or sequence of colors may be selected randomly, or they may be based on the outcome of the wagering game.

19 Claims, 7 Drawing Sheets

GAMING MACHINE WITH COLOR CHANGING CABINET

CROSS-REFERENCE TO RELATED APPLICATIONS

This application is a U.S. national stage of International Application No. PCT/US2007/005215, filed Feb. 28, 2007, which is related to and claims the benefit of U.S. Provisional Application No. 60/842,064, filed Sep. 1, 2006, each of which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a method and system for changing an exterior color of such gaming machines.

BACKGROUND OF THE INVENTION

Gaming machines, such as slot machines, video poker machines and the like, have been a cornerstone of the gaming industry for years. Generally, the popularity of such machines with players depends on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Gaming machine operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "base" game. The bonus game may comprise any type of game, either similar to or completely different from the base game, which is entered upon the occurrence of a selected event or outcome in the base game. Generally, bonus games provide a greater expectation of winning than the base game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines.

Another concept that has been successfully employed to enhance player entertainment value is the use of an attractive exterior on the gaming machines. In particular, gaming machines with bright and colorful exteriors can significantly improve a player's attitude and outlook. An attractive exterior is also more effective in drawing the attention of passersby, resulting in increased interest in the gaming machine. To further enhance player entertainment value, the colors as well as any artwork on the exterior of the gaming machine may be made to match the themes of the wagering games. Examples of such themes include Monopoly™, Powerball™, Top Gun™, Star Trek™, and the like. Where the themes include certain highly recognizable colors and/or images, these colors and/or images may be presented more prominently on the gaming machines.

In existing gaming machines, however, the appearance of the gaming machines is usually fixed once the gaming machine is placed on the casino floor. That is, the "look and feel" of the gaming machine typically stays the same regardless of any events or activities taking place around the gaming machine or occurring in the wagering game. One reason for this lack of variation is the difficulty involved in altering the appearance of an already assembled gaming machines. For example, to apply new artwork or change the color of the gaming machine, typically one or more panels, plates, or other parts have to be removed and replaced. And operators are reluctant to shut down an otherwise operational gaming machine due to the significant decrease in revenue that would result. Therefore, in general, once a gaming machine is put out on the casino floor, the exterior of that gaming machine is set for the duration of its operation.

But because the exterior appearance of a gaming machine can impact player enjoyment and excitement, there is a continuing need to develop gaming machines with enhanced exterior appearances. In particular, there is a continuing need to develop gaming machines where the exterior appearance or "look and feel" of the gaming machines may be altered without having to physically alter the gaming machines.

SUMMARY OF THE INVENTION

According to one aspect of the present invention, a gaming machine for conducting a wagering game comprises a wager input device for receiving a wager input from a player for playing a wagering game and at least one display operable to display an outcome of the wagering game, the outcome being randomly selected from a plurality of outcomes. The gaming machine further comprises a gaming machine cabinet for housing the at least one display, the gaming machine cabinet having at least one color-changeable exterior section, the at least one color-changeable exterior section providing mechanical support for the at least one display. A lighting assembly is operable to direct light having a predetermined color, the light causing the at least one color-changeable exterior section to project the predetermined color.

According to another aspect of the invention, a method of conducting a wagering game on a gaming machine comprises receiving a wager input from a player for playing the wagering game, and displaying an outcome of the wagering game, the outcome being randomly selected from a plurality of outcomes. The method further comprises directing light having a predetermined color, the light causing at least one visually dominant exterior section of the gaming machine to project the predetermined color.

According to yet another aspect of the invention, a gaming machine comprises a wager input device for receiving a wager input from a player for playing a wagering game, and at least one display operable to display an outcome of the wagering game, the outcome being randomly selected from a plurality of outcomes. The gaming machine further comprises a gaming machine cabinet for housing the at least one display, the gaming machine cabinet having at least one color-changeable exterior section. A multi-color lighting assembly within the gaming machine cabinet is operable to direct light having a first color, the light causing the at least one color-changeable exterior section to project the first color. The lighting assembly is further operable to direct light having a second color, the light causing the at least one color-changeable exterior section to project the second color.

Additional aspects of the invention will be apparent to those of ordinary skill in the art in view of the detailed description of various embodiments, which is made with reference to the drawings, a brief description of which is provided below.

DETAILED DESCRIPTION

Figure 1:
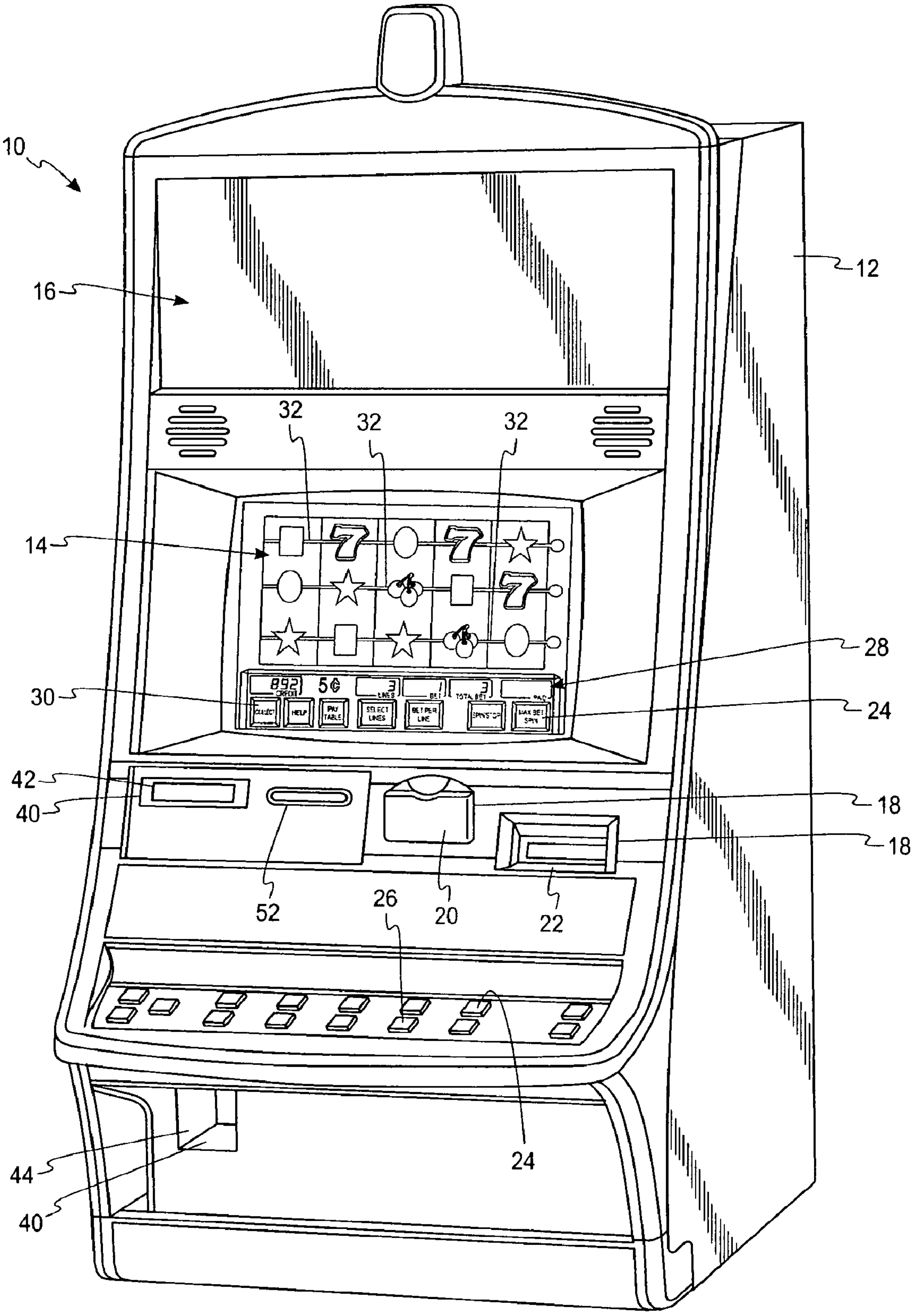
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 used in gaming establishments such as casinos is shown. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the base wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits which are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an option on how to make their game selections. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the base wagering game is displayed to the player on the primary display 14. The primary display 14 can also display the bonus game associated with the base wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the base wagering game by making a wager via the value input device 18 of the gaming machine 10. A player can select play by using the player input device 24, via the buttons 26 or the touch screen keys 30. The base game consists of a plurality of symbols arranged in an array, and includes at least one payline 32 that indicates one or more outcomes of the base game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming terminal 10. The gaming terminal 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
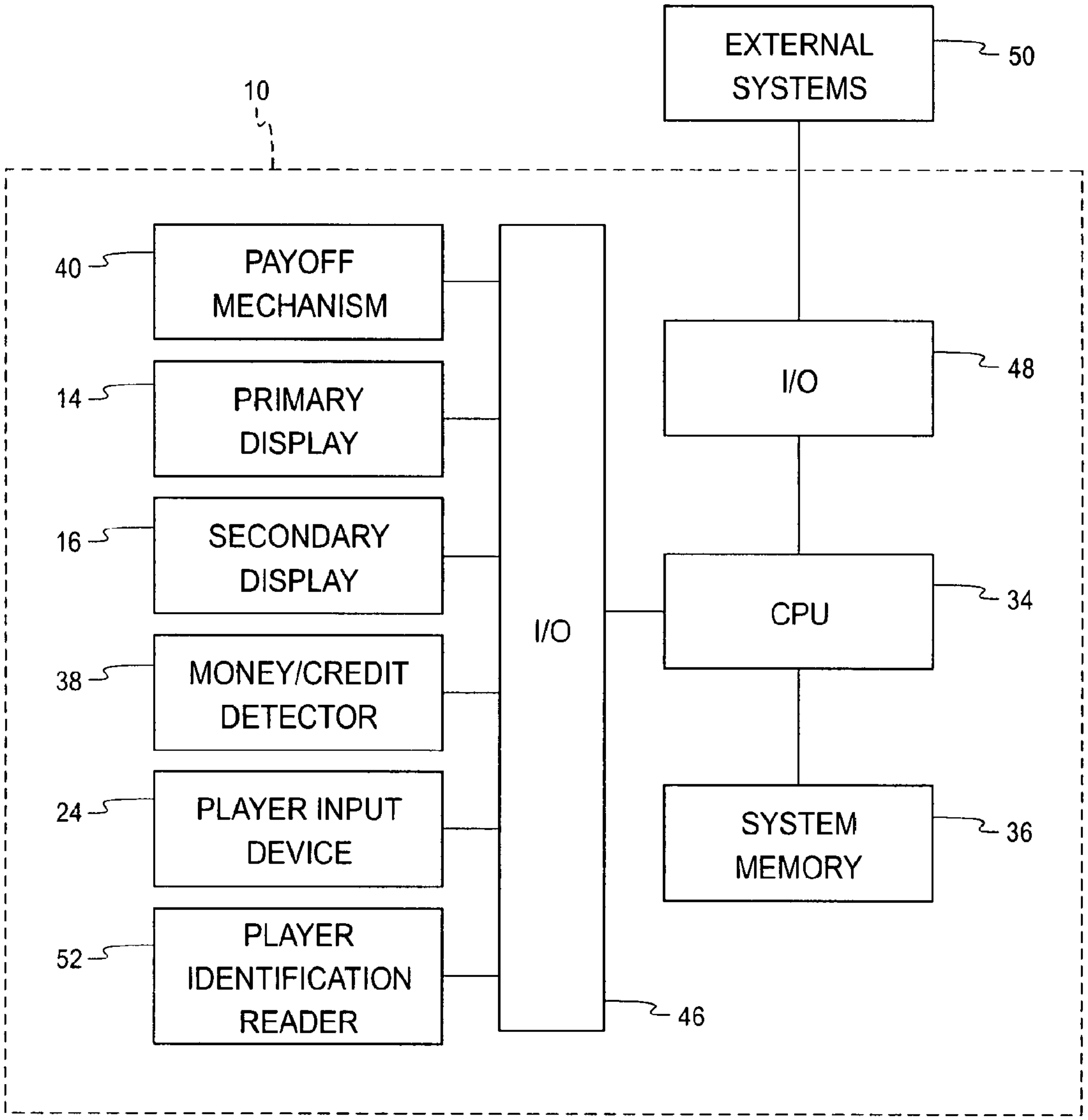
FIG. 2 is a block diagram of a control system suitable for operating the gaming machine of FIG. 1.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the base game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

As mentioned above, in existing gaming machines, the exterior appearance of the gaming machines is generally set regardless of events or activities that may be taking place around the gaming machine or occurring in the wagering games. Embodiments of the invention provide a gaming machine where the exterior appearance or "look and feel" of the gaming machine may be altered as needed. More specifically, embodiments of the invention provide a gaming machine where the colors of one or more exterior sections of the gaming machine may be changed as needed. The change may occur both in real time and without requiring the gaming machine to be shut down or physically altered. The timing of the change may be random, or it may follow some regular or irregular schedule. Similarly, the colors used may be randomly selected, or they may be selected from a plurality of colors according to some predefined color scheme. In some embodiments, the color and/or timing of the color change may also be coordinated to reflect events or activities taking place on the casino floor or occurring in the wagering games.

Figure 3B:
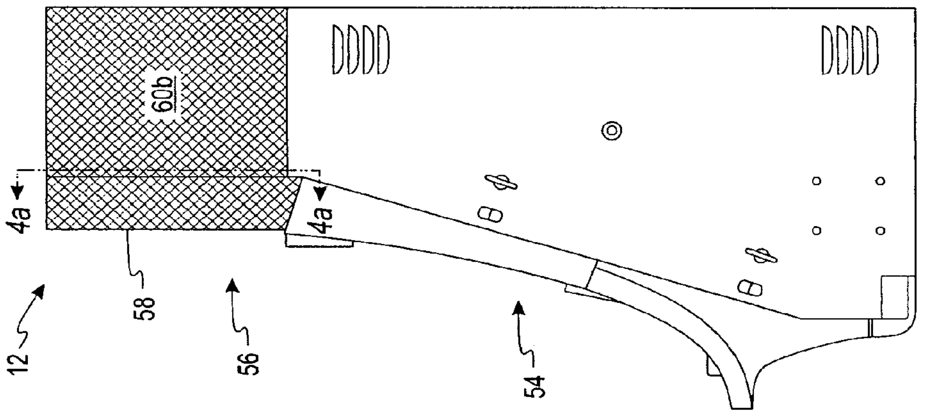
FIGS. 3a-3b are a front view and a side view of a gaming machine having a color-changeable exterior according to embodiments of the invention.
Figure 3A:
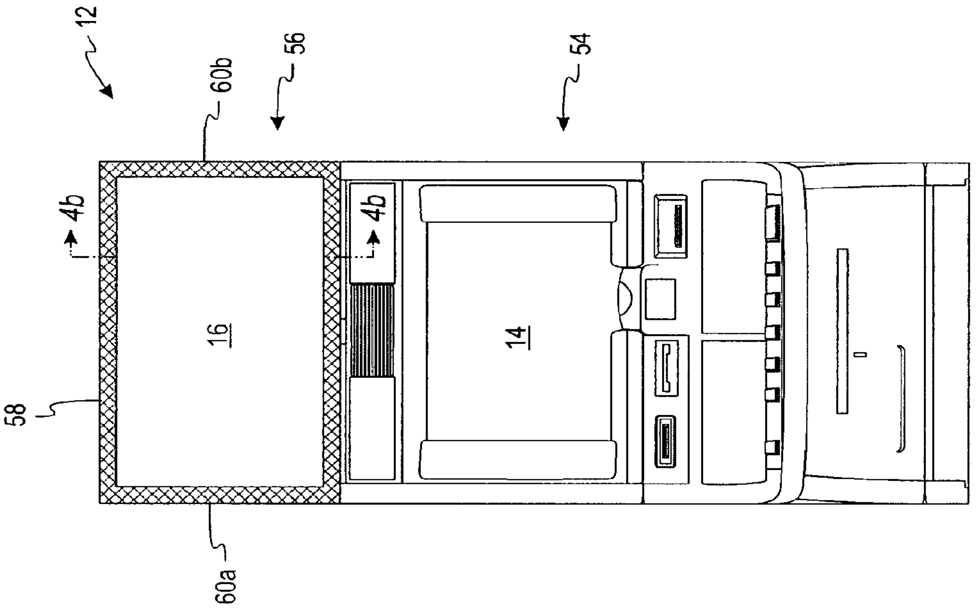

Turning now to FIGS. 3*a*-3*b*, a front view and a side view are shown, respectively, of a gaming machine having one or more colorable or color-changeable exterior sections according to embodiments of the invention. The gaming machine includes, among other things, a cabinet 12 composed of a main body 54 and a top box 56 mounted on the main body 54. The main body 54 and the top box 56 are typically flush or even with each other, but it is possible for one to be bigger than the other, and vice versa, depending on the application. In general, the main body 54 houses and provides mechanical support for the primary display 14 along with its various electrical components, while the top box 56 houses and provides mechanical support for the secondary display 16 along with its various electrical components. For gaming machines that have only one display, the top box 56 may simply house and provide mechanical support for additional electrical components. Note that for purposes of this description, purely decorative and/or ornamental objects and/or artwork, although mounted on or otherwise covering the cabinet 12, are not considered part of the cabinet 12. In addition, the term "mechanical support" as used herein may mean direct mechanical support or it may mean indirect mechanical support (i.e., mechanically supporting, but not directly contacting).

Preferably, the exterior sections of the cabinet 12 that are colorable or color-changeable are those that, in addition to providing mechanical support, are highly visible or visually dominant to casino patrons and passersby. Either the exterior sections themselves (i.e., the actual plates, panels, or other parts that form the exterior sections) may change color, or there may be a cover or laminate over the exterior sections, and it is the cover or laminate that changes color. In any event, these visually dominant exterior sections establish the overall "look and feel" of the gaming machine in the eyes of casino patrons and passersby. Examples of such visually dominant exterior sections include the top box 56 (specifically the front and sides of the top box 56), any marquees that may be mounted on the top box 56, the main body 54 (specifically the front and sides of the main body 54), and other highly visible areas of the cabinet 12. In contrast, the button panel, bill acceptor, ticket reader, and the like, are more visually obscure. These features, along with features that only appear or are only activated during a wagering game, tend not to be part of the overall "look and feel" of the gaming machine in the eyes of casino patrons and passersby.

To render the various exterior sections of the cabinet 12 color-changeable, in some embodiments, these exterior sections may be made of a translucent material. As is well known in the art, a translucent material causes light impinging the material to diffuse as it passes through the material. This diffusion causes the material to glow, shine, or otherwise project the color of the impinging light. Examples of translucent materials include frosted glass, amber, certain kinds of plastics, and the like. In contrast, a transparent material (e.g., glass) allows all or almost all of the light to pass through unimpeded and is therefore essentially colorless. By using a translucent material, the color of one or more exterior sections of the cabinet 12 may be changed simply by changing the color of the impinging light. In some instances, a portion of the translucent material may have an inherent color or may be coated with a colored layer (e.g., tinted). In that case, the color of the impinging light may combine with the color of the translucent material to produce a third color (i.e., a two-tone cabinet).

Referring still to FIGS. 3*a*-3*b*, the particular exterior sections of the cabinet 12 that are color-changeable, in one embodiment, are the bezel 58 and the left and right side panels 60*a* and 60*b* of the top box 56. These exterior sections of the top box 56 are preferred candidates for color change because of their visual prominence. For example, the top box 56 is elevated in height and therefore the bezel 58 and side panels 60*a-b* are easier for patrons and passersby to see relative to the rest of the cabinet 12. In addition, the top box 56 is where the bonus game is typically displayed so that changing the color of various sections of the top box 56 can help associate the color change with certain types of bonus games. This strategy is most effective when the color change is synchronized with events and activities taking place in the bonus games. Of course, other exterior sections of the cabinet 12 (e.g., the top, bottom, and back of the top box 56, the main body 54, etc.) may also be made color-changeable without departing from the scope of invention. Indeed, in some embodiments, all or substantially all of the cabinet 12 may be made color-changeable, depending on the particular application.

Lights of different colors may then be directed onto the translucent material to alter the color of those exterior sections of the cabinet 12 composed of the translucent material. In accordance with embodiments of invention, the light may be provided by a lighting assembly disposed within the cabinet 12. The lighting assembly is preferably a multi-color lighting assembly capable of producing multiple colors of lights. Such a lighting assembly and the components thereof may be mounted to the cabinet 12 using any suitable mounting means (e.g., bolts, brackets, braces, etc.) known to those having ordinary skill in the art. Preferably, the lighting assembly is mounted within the top box 56, but may also be mounted within the main body 54 or some other convenient location. Such a multi-color lighting assembly may then be operated to direct light onto the translucent material, causing the various exterior sections of the cabinet 12 to glow with or project the color of the directed light when viewed from outside the cabinet 12.

In some embodiments, the lighting assembly may also be disposed outside the cabinet 12, for example, on top of the cabinet 12 or on the walls or the ceiling of the casino. Such an external lighting assembly may then be used to direct light onto multiple gaming machine cabinets in the vicinity of the lighting assembly.

Figure 4A:
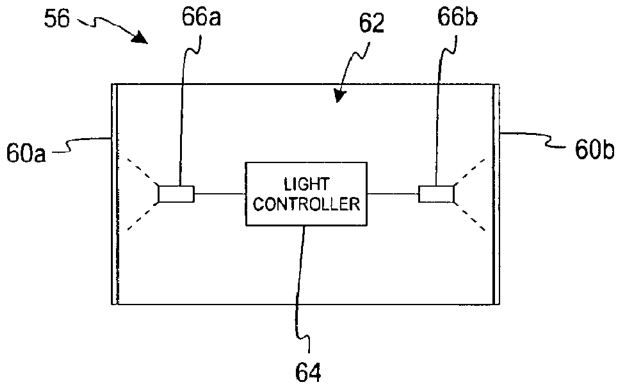
FIGS. 4a-4b is an exemplary implementation of the gaming machine having a color-changeable exterior according to embodiments of the invention.
Figure 4B:
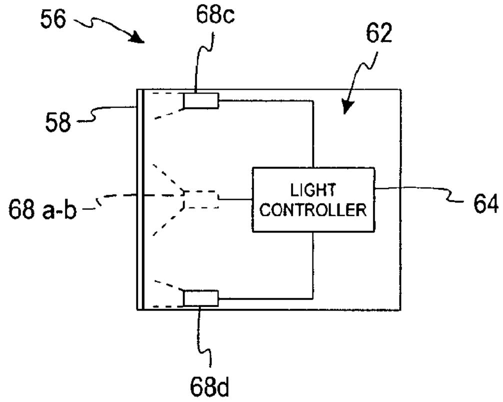

An exemplary implementation of an internal lighting assembly can be seen in FIGS. 4*a*-4*b*, which are cross-sectional views of the top box 56 taken along lines 4*a*-4*a* and 4*b*-4*b* of FIGS. 3*a*-3*b*, respectively. In the implementation shown, the lighting assembly 62 includes a light controller 64 connected to a plurality of light sources. The plurality of light sources may include, for example, side light sources 66*a* and 66*b* (FIG. 4*a*) for each one of the two side panels 60*a-b* of the top box 56 and bezel light sources 68*a*, 68*b*, 68*c*, and 68*d* (FIG. 4*b*) for each one of the top, bottom, and two side segments of the bezel 58. Note that the light sources 68*a-b* for the two side segments of the bezel 58 are shown here in dashed lines due to their positions into and out of the page. Such light sources 66*a-b* and 68*a-d* may be any suitable light sources known to those having ordinary skill in the art, including LED-based light sources as well as more traditional light sources. In either case, the side panel and bezel light sources 66*a-b* and 68*a-d* serve to direct light having different colors onto the bezel 58 and the two sides 60*a-b* of the top box 56. Note that the above one-to-one correspondence is not an absolute requirement, and that in some embodiments, one light source may direct light onto multiple side panels and/or bezel segments, or multiple light sources may direct light onto one side and/or bezel segment, depending on the application.

The timing and color of the light sources 66*a-b* and 68*a-d* is controlled by the light controller 64. In one embodiment, a single centralized light controller 64 controls all the light sources 66*a-b* and 68*a-d* (as shown here). In other embodiments, however, separate light controllers 64 may be used to control predefined sets of light sources 66*a-b* and 68*a-d* in order to provide a higher degree of specificity. For example, one light controller 64 may be used to control the light sources 66*a-b* for the left and/or right side panel 60*a-b* of the top box 56, and another light controller 64 may be used to control the light sources 68*a-d* for the bezel 58. Where the light sources 66*a-b* or 68*a-d* are grouped into predefined sets, a light controller 64 and its respective set of light sources 66*a-b* or 68*a-d* may be combined on a single multi-color light board. Such light boards are commercially available from, for example, Nichia Corp. of Detroit, Mich. and Cree Inc. of Durham, N.C. Other suitable multi-color light boards may be also used without departing from the scope of the invention.

Figure 5:
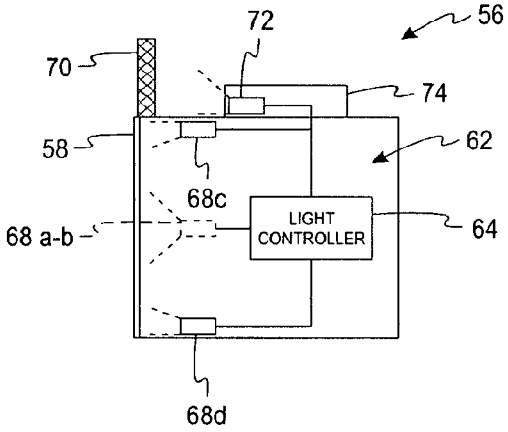
FIGS. 5 and 6 are implementations of other gaming machines having a color-changeable exterior according to embodiments of the invention.

FIG. 5 is a cross-sectional side view of the top box 56 showing another exemplary implementation of the lighting assembly 62 where one or more light sources have been added in order to illuminate other sections of the cabinet 12. In the example shown, the additional section is a marquee 70 mounted on top of the top box 56. Such marquees 70 are considered to be one of the visually dominant sections (as defined above) of the cabinet 12 and are often used to further enhance and promote the gaming machines and the wagering games thereon. To this end, the marquee 70 may contain graphics (e.g., artwork, logos, etc.) and/or text that relate to the themes of the wagering games and other promotional content.

In accordance with embodiments of the invention, the marquee 70 is also color-changeable (i.e., made of a translucent material) along with the bezel 58 and the two side panels 60*a-b* of the top box 56. A marquee light source 72 may then be provided on top of the top box 56 to illuminate the marquee 70. As with the other light sources 66*a-b* and 68*a-d*, the marquee light source 72 may be any suitable light source capable of directing lights of different colors onto the marquee 70, including an LED-based light source and more traditional light sources. In some embodiments, an enclosure 74 may be provided on top of the top box 56 for housing the marquee light source 72. Preferably, the enclosure 74 is lockable and tamper-resistant in order to prevent inadvertent or deliberate contact by casino patrons and passersby.

Figure 6:
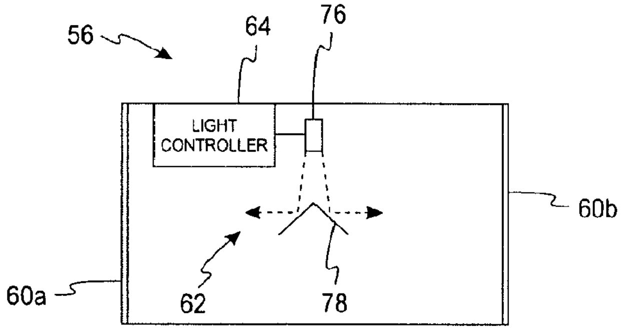

FIG. 6 is a cross-sectional side view of the top box 56 showing yet another exemplary implementation of the lighting assembly 62. Here, instead of two light sources 66*a-b*, one for each side of the top box 56, the lighting assembly 62 may include a single light source 76 for both sides of the top box 56. A mirror array 78 may then be used to deflect the light from the single light source 76 onto both side panels 60*a-b* of the top box 56. In one implementation, the mirror array 78 may be an upside-down V shape, with each segment of the V formed by a mirror or other reflective surfaces. Of course, it is not necessary for the two segments of the V to actually meet or come together (i.e., there may be some distance between them for allowing light to pass in between). The light source 76 may then be positioned so as to direct light onto the mirror array 78 in a manner that deflects the light from the light source 76 towards both the left and right side panels 60*a-b* of the top box 56.

Although not expressly shown, in the foregoing embodiments, the light controller 64 (or multiple light controllers 64) may be connected to or otherwise in communication with the controller of the gaming machine (e.g., controller 34 in FIG. 2). This allows operation of the lighting assembly 62 to be coordinated with operation of the gaming machine and/or the wagering games thereon and/or the external systems 50 to further enhance player entertainment and interest in the gaming machine. For example, the light controller 64 may be instructed to direct a specific color or a sequence of colors onto the color-changeable sections of the cabinet 12 to indicate that certain events are occurring in the wagering game (e.g., start of a bonus game, jackpot about to hit, etc.). The color or sequence of colors may also be used to promote activities taking place on the casino floor (e.g., seasonal/holiday celebrations, various tournaments, etc.). Or they may serve simply as a way to generate interest in the gaming machine during periods of inactivity (e.g., attract mode). The timing of the color or sequence of colors may also indicate certain events are occurring in the wagering game (e.g., faster flashing as the jackpot increases).

Figure 7:
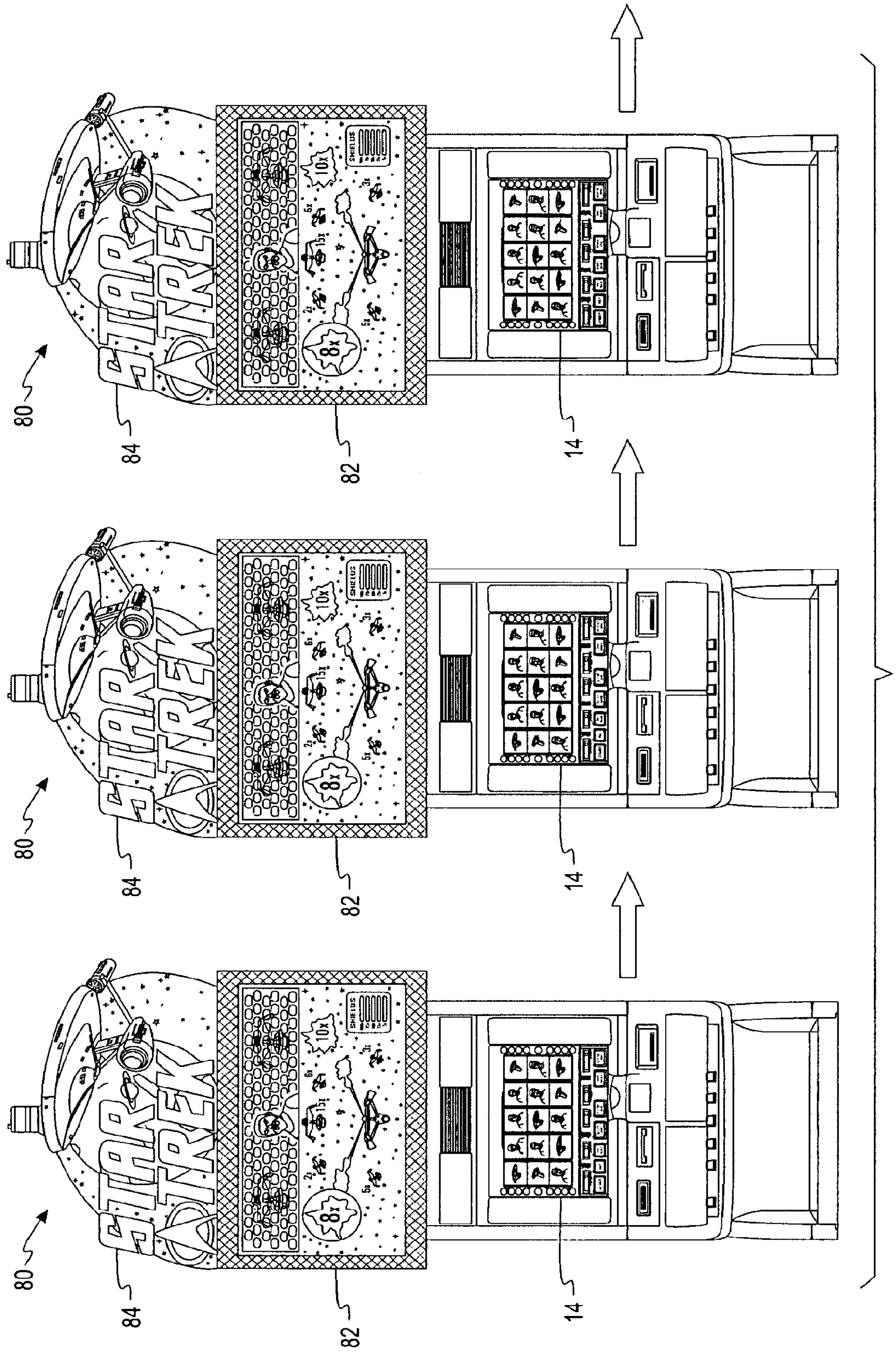
FIG. 7 shows a gaming machine having a color-changeable exterior going through different colors according to embodiments of the invention.

An example of the above coordination can be seen in FIG. 7, where a gaming machine 80 is shown with a color-changeable top box 82 progressing through a sequence of colors (e.g., red on the left, green in the middle, and blue on the right). In some embodiments, a color-changeable marquee 84 may also be present on the gaming machine 80 and progressing through the same sequence of colors at the same time. The gaming machine 80 in this example is a 5-reel video slot machine game, with each reel having a plurality of reel symbols thereon, as displayed on the primary display 14. A secondary display may also be present in some embodiments, in which case the top box 82 would house the secondary display instead of the art glass shown here.

One or more wagering games may be played on the gaming machine 80, including a base wagering game and a bonus wagering game. Any suitable base and/or bonus wagering game may be used, but the particular bonus wagering game here is an episodic wagering game having a Star Trek theme. Episodic wagering games, as is known to those having ordinary skill in the art, are games involving a series of stages or levels where each stage or level produces a progressively higher award. Players must complete lower stages or levels (or at least a portion thereof) before advancing to higher stages or levels. Typically, game assets or attributes accumulated by the players in the lower stages or levels are retained across multiple gameplay sessions and/or gaming machines for use in the higher stages or levels.

In accordance with embodiments of the invention, the color-changeable top box 82 and/or marquee 84 of the gaming machine 80 may be made a certain color based on the particular stage or level of the wagering game attained by the player. In some embodiments, each stage or level may have a dominant color, as displayed on the primary display 14 (or the secondary display), and the color of the top box 82 and/or marquee 84 may be made to match that dominant color. This allows casino patrons and passersby to know exactly which particular stage or level the player is currently playing (or at least recognize that the player is making progress). As the player advances to higher and higher levels, these patrons and passersby naturally become more interested and may gather around the gaming machine 80 in order to better observe the gameplay in progress. This increased attention creates greater interest in the gaming machine 80 (thus, benefiting the casino) and may also enhance the enjoyment and excitement felt by the player.

Figure 8:
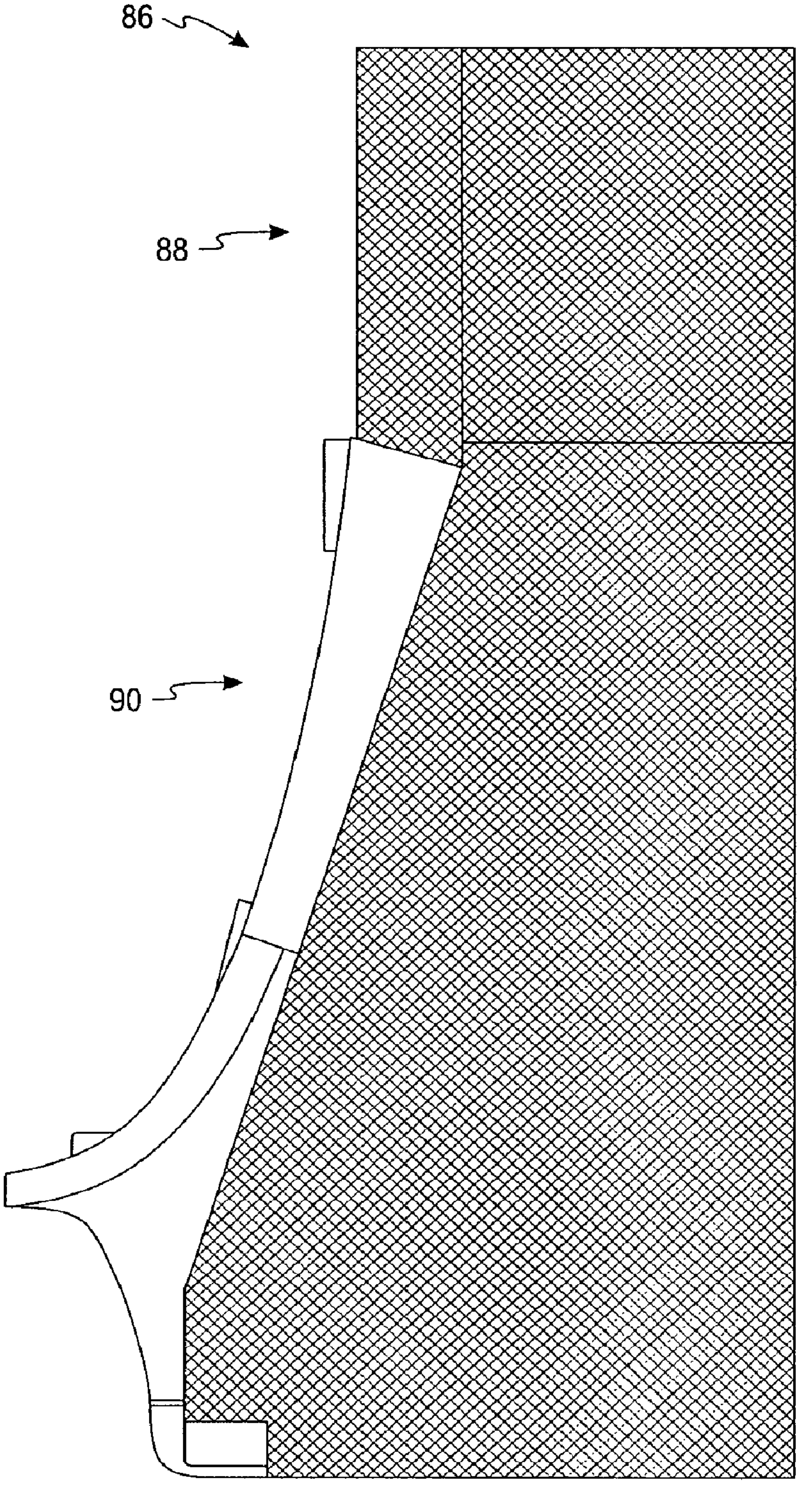
FIG. 8 is a side view of another gaming machine having a color-changeable exterior according to embodiments of the invention.

In some embodiments, in addition to the top box and/or marquee, other exterior sections of the gaming machine may also be color-changeable. Indeed, in some embodiments, the entire cabinet or almost the entire cabinet of the gaming machine may be color-changeable. An example of the above is shown in FIG. 8, where a gaming machine has a cabinet 86 in which the top box 88 as well as most of the main body 90 is color-changeable. Assembly for such a color-changeable cabinet 86 may be completed using techniques known to those having ordinary skill in the art, with the exterior panels, plates, and other parts for such a cabinet 86 being made of a translucent material instead of standard opaque material.

Figure 9:
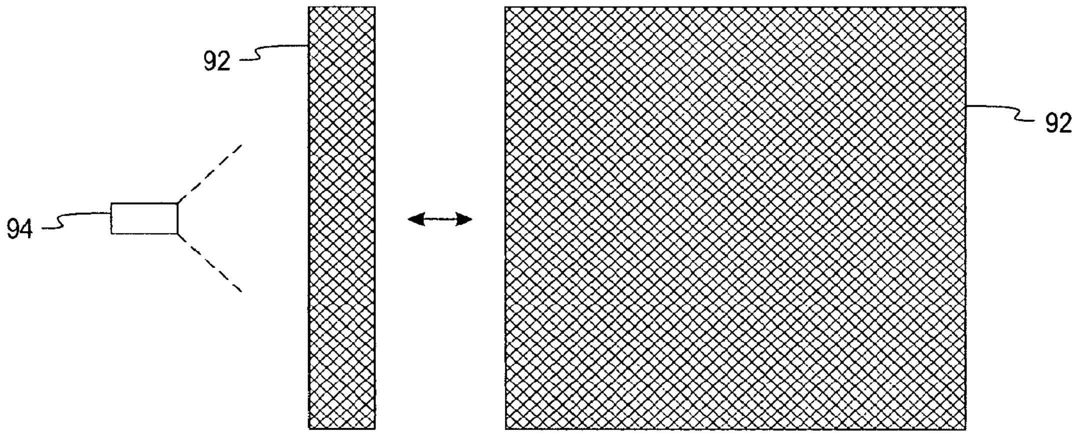
FIGS. 9 and 10 are exemplary color-changeable exterior panels that may be used in the gaming machine according to embodiments of the invention.

FIG. 9 illustrates an edge view and a side view of an exemplary translucent material 92 that may be used to assemble a gaming machine having one or more color-changeable exterior sections according to embodiments of the invention. In one embodiment, the translucent material 92 may be a translucent plastic material, such as polypropylene, polyethylene, polycarbon, and the like. The translucent plastic material is preferably white or off-white, but may be any color suitable for a particular application. Such a translucent plastic material may be produced in sheets having a predetermined size and thickness, then formed into various panels, plates, and other parts used in the gaming machine. Any suitable process may be used to achieve the desired shape for the panels, plates, and other parts, including vacuum-forming, vacuum-molding, injection-molding, fabrication, and other known manufacturing processes. Light having a desired color is made and the directed onto either face of the translucent plastic material to achieve the desired color, as demonstrated by the light source 94. In some embodiments, either face of the translucent plastic material may be selectively or randomly scored or otherwise roughened to produce an enhanced fighting effect.

Figure 10:
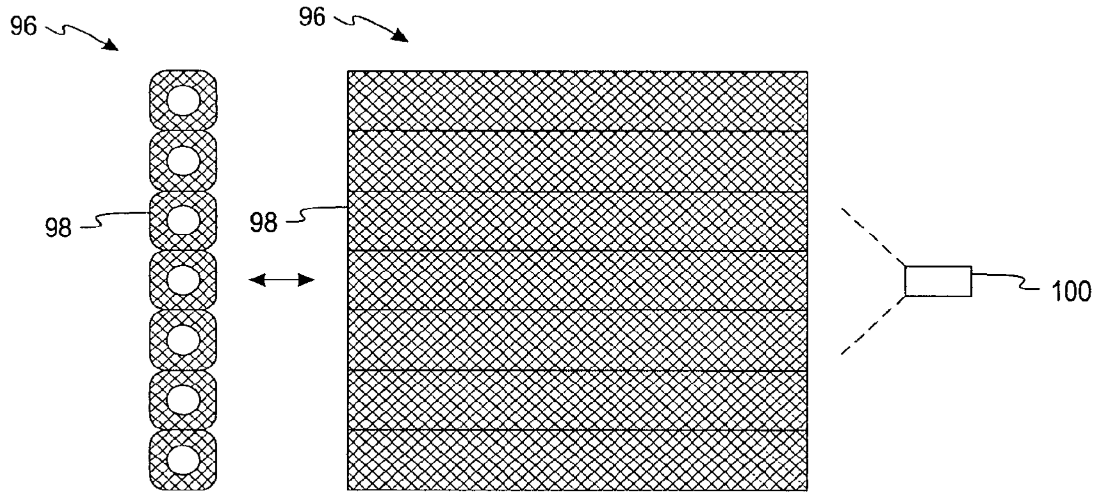

In some embodiments, instead of a single solid sheet of translucent material, the translucent material may be formed from a plurality of translucent pipes. FIG. 10 illustrates an edge view and a side view of an exemplary translucent material 96 formed from a plurality of translucent pipes 98. Such translucent pipes 98 may be extruded to have the desired dimensions using the same or a similar translucent plastic material as that mentioned above (e.g., polypropylene, polyethylene, polycarbon, etc.). The translucent pipes 98 may then be attached or otherwise adhered side-to-side (as opposed to end-to-end) to form the pipe-based translucent material 96. Such a pipe-based translucent material 96 may thereafter be vacuum-formed, vacuum-molded, injection molded, and the like, into the panels, plates, and other parts needed for the gaming machine. As before, either face of the pipe-based translucent material 96 may be selectively or randomly scored or otherwise roughened to produce an enhanced lighting effect.

An advantage of the pipe-based translucent material 96 is that the translucent pipes 98 act as an optical guide, thus allowing light to be directed into either edge, as demonstrated by the light source 100. Such edge lighting requires little (if any) 3-dimensional spacing for mounting the light source 100 when using techniques known to those having ordinary skill in the art, thus allowing the pipe-based translucent material 96 to act as a laminate over existing structures (e.g., panels, plates, and other parts). Indeed, in some cases, a light source may be mounted within the opening at one end of each translucent pipe in the pipe-based translucent material 96. In any event, the laminate may then be used to retrofit older gaming machines with one or more color-changeable exterior sections according to embodiments of the invention. As a result, both new gaming machines and gaming machines that are already deployed on the casino floor may benefit from the color coordination described above.

While the invention has been described with reference to one or more particular embodiments, those skilled in the art will recognize that many changes may be made thereto without departing from the spirit and scope of the invention. Accordingly, each of these embodiments and obvious variations thereof is contemplated as falling within the spirit and scope of the invention, which is set forth in the following claims.

What is claimed is:

1. A gaming machine, comprising:

a wager input device for receiving a wager input from a player for playing a wagering game;

at least one display operable to display an outcome of said wagering game, said outcome being randomly selected from a plurality of outcomes;

a gaming machine cabinet for housing said at least one display, said gaming machine cabinet having both a main body and a top box with opposing side panels, at least one of said side panels including at least one color-changeable exterior section comprising substantially all of an exterior side of said side panel;

a multi-color lighting assembly within said gaming machine cabinet, said lighting assembly operable to direct light having a first color, said light causing said at least one color-changeable exterior section to project said first color in response to a first event associated with said wagering game, said lighting assembly further operable to direct light having a second color, said light causing said at least one color-changeable exterior section to project said second color in response to a second event associated with said wagering game; and a controller operable to change a color of said light from said first color to said second color based on said outcome of said wagering game.

2. The gaming machine according to claim 1, wherein said at least one color-changeable exterior section comprises a translucent material.

3. The gaming machine according to claim 2, wherein said translucent material is a sheet of translucent material and said light is directed onto a face of said sheet of translucent material.

4. The gaming machine according to claim 2, wherein said translucent material is a pipe-based translucent material composed of a plurality of translucent pipes and said light is directed into an edge of said pipe-based translucent material.

5. The gaming machine according to claim 4, wherein said pipe-based translucent material forms a laminate layer over said at least one color-changeable exterior section.

6. The gaming machine of claim 1, wherein said events include playing a different level of said wagering game.

7. A gaming machine, comprising:

a wager input device for receiving a wager input from a player for playing a wagering game;

at least one display operable to display an outcome of said wagering game, said outcome being randomly selected from a plurality of outcomes;

a gaming machine cabinet for housing said at least one display, said gaming machine cabinet including a main body and a top box, said top box including opposing side panels, said opposing side panels each including a color-changeable exterior section comprising substantially all of said side panel exterior, said color-changeable exterior sections providing mechanical support for said at least one display; and a multi-color lighting assembly within said gaming machine cabinet operable to direct light having multiple predetermined colors including a first color and a second color, said light causing at least one of said color-changeable exterior sections to project different ones of said multiple predetermined colors in response to events associated with said wagering game; and a controller operable to change at least one of said multiple predetermined colors of said light from said first color to said second color based on said outcome of said wagering game.

8. The gaming machine according to claim 7, wherein said lighting assembly comprises one or more multi-color light emitting diodes for directing said light having at least one of said multiple predetermined colors onto said at least one of said color-changeable exterior sections.

9. The gaming machine according to claim 7, wherein said lighting assembly comprises one or more mirrors for directing said light having at least one of said multiple predetermined colors onto said at least one of said color-changeable exterior sections.

10. The gaming machine according to claim 7, further including at least one additional color-changeable exterior section comprising substantially all of a side panel of said main body, said multi-color lighting assembly being further operable to direct light having multiple predetermined colors to said additional color-changeable exterior section.

11. The gaming machine according to claim 7, further comprising a color-changeable marquee mounted on said gaming machine cabinet, wherein said lighting assembly is further operable to direct said light having at least one of said multiple predetermined colors onto said color-changeable marquee, said light causing said color-changeable marquee to project said predetermined color.

12. The gaming machine of claim 7, wherein said events include playing a different level of said wagering game.

13. A method of conducting a wagering game on a gaming machine, said gaming machine including a cabinet having a top box with opposing side panels, the method comprising:

receiving a wager input from a player for playing said wagering game;

displaying an outcome of said wagering game, said outcome being randomly selected from a plurality of outcomes;

directing light having a first predetermined color, said light causing at least one exterior section comprising substantially all of an exterior side of at least one of said side panels to project said first predetermined color in response to a first event associated with said wagering game; and directing light having a second predetermined color, said light causing said at least one exterior section to project said second predetermined color in response to a second event associated with said wagering game, wherein said second predetermined color is selected based on said second event being the outcome of said wagering game.

14. The method according to claim 13, wherein said light is directed from within said gaming machine.

15. The method according to claim 13, wherein said directing of said light onto said at least one exterior section is performed randomly.

16. The method according to claim 13, wherein said directing of said light onto said at least one exterior section is performed based on said outcome of said wagering game.

17. The method according to claim 13, wherein said predetermined colors are selected based on one of the following: randomly, and according to a predefined color scheme.

18. The method according to claim 13, further comprising directing said light having said first predetermined color onto a marquee of said gaming machine, said light causing said marquee to project said first predetermined color.

19. A method of conducting a wagering game on a gaming machine, said gaming machine including a cabinet having a top box with opposing side panels, the method comprising:

receiving a wager input from a player for playing said wagering game;

displaying an outcome of said wagering game, said outcome being randomly selected from a plurality of outcomes;

directing light having a first predetermined color, said light causing at least one exterior section comprising substantially all of an exterior side of at least one of said side panels to project said first predetermined color in response to a first event associated with said wagering game; and directing light having a second predetermined color, said light causing said at least one exterior section to project said second predetermined color in response to a second event associated with said wagering game, wherein said wagering game is an episodic wagering game having a plurality of stages and said first and second predetermined colors are a part of a sequence of colors, each color in said sequence of colors corresponding to one stage in said plurality of stages of said episodic wagering game.

* * * * *